(12) United States Patent
Nguyen et al.

(10) Patent No.: US 6,631,748 B1
(45) Date of Patent: Oct. 14, 2003

(54) SIDEWALL WITH INSERT CONSTRUCTION FOR RUNFLAT TIRE

(75) Inventors: Gia Van Nguyen, Rossignol (BE); Alain Emile Francois Roesgen, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/701,443

(22) PCT Filed: Jul. 6, 1998

(86) PCT No.: PCT/US98/13929
§ 371 (c)(1),
(2), (4) Date: Nov. 27, 2000

(87) PCT Pub. No.: WO00/01543
PCT Pub. Date: Jan. 13, 2000

(51) Int. Cl.[7] .................... B60C 17/00; B60C 17/04; B60C 17/08; B60C 9/02
(52) U.S. Cl. ............... 152/516; 152/548; 152/556; 152/517
(58) Field of Search ................ 152/517, 548, 152/556, 518

(56) References Cited

U.S. PATENT DOCUMENTS

| | | | |
|---|---|---|---|
| 3,954,131 A | * | 5/1976 | Hoshino ............... 152/517 |
| 4,111,249 A | | 9/1978 | Markow |
| 5,368,082 A | | 11/1994 | Oare et al. |
| 5,871,600 A | | 2/1999 | Oare et al. |

FOREIGN PATENT DOCUMENTS

| | | |
|---|---|---|
| EP | 0005399 | 11/1979 |
| EP | 0385192 | 9/1990 |
| EP | 0613795 | 9/1994 |
| EP | 0844110 | 5/1998 |
| GB | 2138367 | 4/1984 |
| WO | WO97/07995 | 3/1997 |

* cited by examiner

Primary Examiner—Michael W. Ball
Assistant Examiner—Justin Fischer
(74) Attorney, Agent, or Firm—Howard M Cohn

(57) ABSTRACT

A pneumatic radial ply passenger tire (10) having a tread (12), a casing with two sidewalls (20), two radial plies (38, 40) extending from and wrapped about two annular beads (26) and a belt reinforcement structure (36) located radially between the tread and the plies. Inner ply (38) is reinforced with essentially inextensible metal cords and is designed to carry a compressive load during runflat operation. Outer ply (40) is reinforced with organic-fiber cords designed to withstand tensile stresses during runflat operation. A circumferentially deployed insert (42) is disposed between the inner and outer radial plies (38, 40) in each sidewall (20) adjacent to the shoulder of the tread. The metal cords (41) of inner ply (38) have compressive-load-hearing capacity which reduces the mass of the insert material (42). The metal cords (41) also have thermal conductivity properties that dissipate heat buildup from both ply (38) and insert (42).

12 Claims, 3 Drawing Sheets

SIDEWALL WITH INSERT CONSTRUCTION FOR RUNFLAT TIRE

TECHNICAL FIELD

The present invention relates to a pneumatic radial tire and, more specifically, to a pneumatic radial tire having runflat capability by providing, at the sidewall of the tire, a metal-reinforced ply and a circumferentially deployed insert, such that the tire is capable of being used in the uninflated condition.

BACKGROUND OF THE INVENTION

Various methods have been devised for enabling the safe continued operation of unpressurized or underpressurized passenger-car tires without damaging the tire further and without causing poor steering, over a distance from the place where the tire lost its pressure to a place desired by the driver, such as a service station where the tire can be changed. Loss of tire pressure can result from a variety of causes, including puncture by a foreign object such as a nail or other sharp object piercing the pneumatic tire installed on a vehicle.

Pneumatic tires designed for continued operation under conditions of unpressurization or underpressuration are also called runflat tires, as they are capable of being driven in the uninflated condition. The conventional pneumatic tire when operated without inflation collapses upon itself when supporting a vehicle load. In general, the term "runflat" means that the tire structure alone has sufficient strength to support the vehicle load when the tire is operated in the uninflated condition such that the sidewall and internal surfaces of the tire do not collapse or buckle onto themselves, without recourse to incorporation of any internal support devices to prevent the tire from collapsing.

One approach to runflat tire design is described in U.S. Pat. No. 4,111,249, entitled the "Banded Tire," in which a hoop or annular band approximately as wide as the tread was placed under the tread. The hoop in combination with the rest of the tire structure could support the vehicle weight in the uninflated condition. This banded tire actually tensioned the ply cords even in the uninflated condition.

Numerous other methods have been used to achieve workable runflat tire design. Generally, such tires incorporate sidewall designs that are thicker and/or stiffer, so that the tire's load can be carried by an uninflated tire without otherwise compromising vehicle handling until such reasonable time as the tire can be repaired or replaced. The methods used in sidewall stiffening include the incorporation of inserts or fillers generally having, in cross-sectional view, a crescent shape. Such inserts or fillers are located in the inner peripheral surface of the sidewall portion of the carcass, which is the region in the tire usually having the lowest rigidity. In such runflat tire designs, the entire sidewall has a crescent shaped cross-section so as to provide rigidity. The sidewalls of such tires, when operated in the uninflated condition, experience a net compressive load, though with outer portions of the sidewalls necessarily being in tension due to the bending deformation, especially in the regions of the sidewall adjacent to the ground-contacting portion of the tread. Due to the large amounts of rubber required to stiffen the sidewall members, heat buildup is a major factor in tire failure especially when the uninflated tire is operated for prolonged periods at high speeds.

A Goodyear patent (U.S. Pat. No. 5,368,082) disclosed the first commercially accepted runflat pneumatic radial ply tire, the relatively low-aspect-ratio, Eagle GSC-EMT tire. The U.S Pat. No. 5,368,082 teaches the employment of special sidewall inserts to improve stiffness. Approximately six additional pounds of weight per tire was required to support an 800 pound (lb) load in this uninflated tire. This earlier invention, although superior to prior attempts at runflat tire design, still imposed a weight penalty that could be offset by the elimination of a spare tire and the tire jack. However, this weight penalty was more problematic when the engineers attempted to build high-aspect-ratio, runflat tires for larger luxury sedans. The required supported weight for an uninflated luxury car tire approximates 1400 lbs. These taller sidewalled tires, having aspect ratios in the 55% to 65% range or greater, means that the sidewall bending stresses are several times that of the earlier low-aspect-ratio runflat Corvette type tires. Such loads meant that the sidewalls and overall tire had to be stiffened to the point of compromising ride. Being that luxury vehicle owners do not expect to sacrifice ride quality for runflat capability, the engineering requirements for runflat tire design require that there be no loss in ride or performance. In the very stiff suspension performance type vehicle, such as the Corvette and various sport/utility vehicles, the ability to provide such runflat tires was relatively straightforward compared to providing similar runflat tires for luxury sedans which require softer ride characteristics. Light truck and sport utility vehicles, although not as sensitive to ride performance, provide a runflat tire market that ranges from accepting a stiffer ride to demanding the softer luxury type ride.

Runflat tire design, as disclosed for example in U.S. patent application Ser. No. 08/865,489, entitled RUNFLAT TIRE WITH IMPROVED CARCASS, having a common assignee with the present invention and incorporated in its entirety by reference herein, is based on the installation of a plurality of heavy-ply wedge fillers or inserts inside each sidewall flex area. The inserts add rigidity to the sidewalls in the absence of air pressure during runflat operation. But while the high resistance to compression of the compound of the insert wedges provides the necessary resistance to the collapse of the loaded tire without air pressure, this method has several drawbacks. The two most important ones are heavy tire weight and heat buildup in the wedge inserts.

OBJECTS OF THE INVENTION

It is an object of the present invention to provide a pneumatic radial ply runflat tire, the tire as defined in one or more of the appended claims and, as such, having the capability of being constructed to accomplish one or more of the following subsidiary objects.

An object of the present invention is to provide a pneumatic radial runflat tire having good tire life and vehicle handling characteristics and a satisfactory ride, by incorporating a wire-reinforced innermost radial ply whose compression-load-bearing capabilities reduce the amount of insert material typically used in runflat tire designs.

Another object of the present invention is to provide a pneumatic radial runflat tire which can be constructed of two carcass plies, the innermost of which is reinforced by metal wire and the outermost being fabric reinforced, the two plies being separated in each sidewall by an insert disposed in the sidewall flex area.

Another object of the present invention is to provide a pneumatic radial runflat tire in which, when operating in a runflat condition, the outermost fabric ply supports tensile stresses while the wire-reinforced inner ply and a part of the insert, support compression stresses.

Still another object of the present invention is to provide a radial runflat tire which uses the high thermal conductivity of a wire-reinforced inner ply to redistribute the heat buildup in the insert during normal tire operation and, in particular, during runflat operation.

Yet another object of the present invention is to minimize heat buildup in the insert by using an inner wire-reinforced ply to carry a significant share of the compressive portion of the runflat load.

SUMMARY OF THE INVENTION

The present invention relates to a pneumatic radial ply runflat passenger tire having a tread, a casing with two sidewalls, two radial plies extending from two annular beads and a belt reinforcement structure located radially between the tread and the plies. The runflat sidewall design is characterized by an inner radial ply having metal reinforcement cords and an outer radial ply having organic fiber reinforcement cords. An insert is circumferentially disposed between the inner and outer plies in the region of each sidewall adjacent to the tread shoulder. The insert in each sidewall has properties characterized by high tensile strength, low hysteresis and light weight. The strength and rigidity of the insert can be adjusted by the incorporation of organic fibers aligned more or less in the radial direction within the insert. Metal reinforcing cords in the inner radial ply have properties characterized by a high modulus of elasticity, rigidity with respect to carrying the compressive load on the inserts during runflat operation, and good thermal conductivity which distributes heat generated within the inserts during runflat operation. During runflat operation, the high modulus of the reinforcing metal cords of the inner ply carry a substantial compressive load, thereby reducing the compression load carried by the single insert in each sidewall. Also during runflat operation, the outer organic-fiber reinforced ply has good flexibility accompanied by high tensile-stress-bearing capacity.

In one embodiment of the invention, the pneumatic radial runflat passenger tire has a low-profile design geometry suitable, aesthetically and/or pragmatically, for use on sports-type vehicles.

In another embodiment, the pneumatic radial ply runflat passenger tire has a high-profile design geometry suitable, aesthetically and/or pragmatically, for use on luxury vehicles and high-standing sport-utility vehicles.

Tire structure according to this invention incorporates adjustments to the composition of the insert in each sidewall as well as to the overall cross-sectional area of the metal reinforcements in the innermost ply in accordance with the intended usage in high-low- or intermediate-profile tire designs.

BRIEF DESCRIPTION OF THE DRAWINGS

The structure, operation, and advantages of the presently preferred embodiment of the invention will become further apparent upon consideration of the following description taken in conjunction with the accompanying drawings, wherein.

DEFINITIONS

Figure 1:
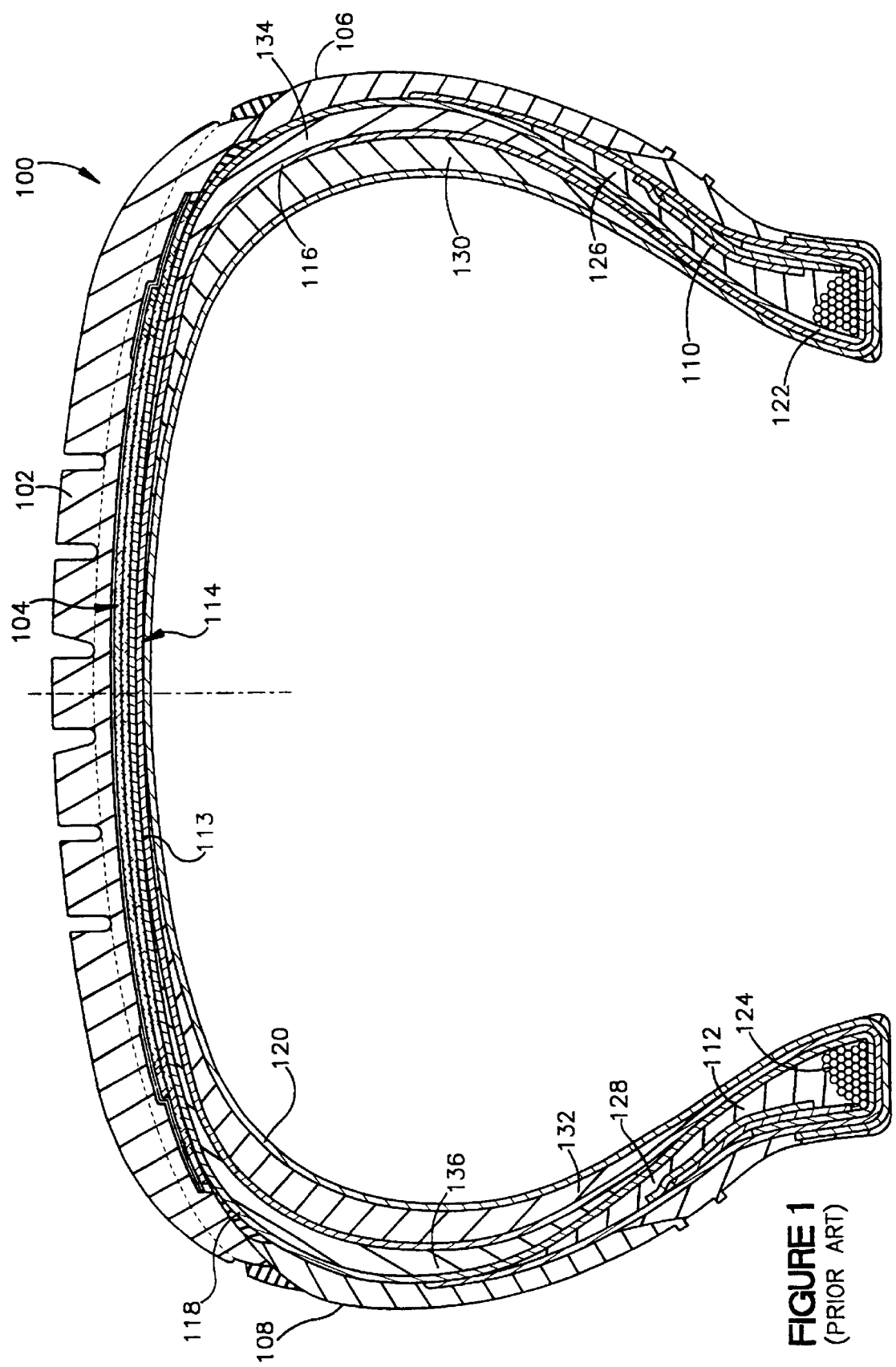
FIG. 1 is a cross-sectional view of a prior art runflat tire.

"Aspect Ratio" means the ratio of the section height of a tire to its section width.

"Axial" and "axially" means the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 170° to 270° with respect to the equatorial plane of the tire.

"Carcass" means the tire structure apart from the belt structure, tread, undertread over the plies, but including the beads.

"Casing" means the carcass, belt structure, beads, sidewalls and all other components of the tire excepting the tread and undertread.

"Circumferential" means lines or directions extending along the perimeter of the surface of the annular tread perpendicular to the axial direction.

"Cord" means one of the reinforcement strands of which the plies in the tire are comprised.

"Equatorial Plane" means the plane perpendicular to the tire's axis of rotation and passing through the center of its tread.

"Innerliner" means the layer or layers of elastomer or other material that form the inside surface of a tubeless tire and that contain the inflating gas within the tire.

"Insert" means the crescent- or wedge-shaped reinforcement typically used to reinforce the sidewalls of runflat-type tires.

"Lateral" means a direction parallel to the axial direction.

"Normal Inflation Pressure" means the specific design inflation pressure and load assigned by the appropriate standards organization for the service condition for the tire.

"Ply" means a layer of rubber-coated parallel cords.

"Radial" and "radially" mean directions radially toward or away from the axis of rotation of the tire.

"Radial Ply Structure" means the one or more carcass plies of which at least one ply has reinforcing cords oriented at an angle of between 65 degrees and 90 degrees with respect to the equatorial plane of the tire.

"Radial Ply Tire" means a belted or circumferentially-restricted pneumatic tire in which at least one ply has cords that extend from bead to bead and are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal inflation pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

DETAILED DESCRIPTION OF THE PREFERRED EMBODIMENT PRIOR ART EMBODIMENT

Currently, the construction of a prior art runflat tire, which is also known as an Extended Mobility Tire, is based on the use of inserts located in the sidewall flex area. Each insert typically is crescent-shaped in cross section and is disposed circumferentially around the sidewall. When the tire is uninflated, the inserts in each sidewall provide the necessary resistance to the collapse of the tire.

With reference to FIG. 1, a portion of the cross section of a prior art pneumatic radial runflat tire 100 for use in passenger vehicles is illustrated in accordance with that disclosed in U.S. Pat. No. 5,368,082. The tire 100 is a passenger tire having a tread 102, a belt structure 104, a pair of sidewall portions 106, 108, a pair of bead portions 110, 112, a radial ply structure 113 and a carcass reinforcing structure 114. The carcass 114 includes a first ply 116 and second ply 118 of the radial ply structure 113, an inner liner 120, a pair of beads 122, 124, a pair of bead filler apexes 126, 128, a pair first insert fillers 130, 132 and a pair of second insert fillers 134, 136. The first insert fillers 130, 132 are located between the inner liner 120 and the first ply 116 and the second insert fillers 134, 136 are located between the first and second plies 116, 118. This carcass structure 114 gives the tire 100 a limited runflat capability.

As can be seen from FIG. 1, the structural reinforcement in the sidewall area of the tire 100 substantially increases the thickness of the overall sidewall. This prior art patent taught that the overall sidewall thickness, where it merges with the shoulder, should be at least 100%, preferably 125%, of the overall sidewall thickness. This was believed to be necessary to sufficiently support the load in an uninflated state. However, the additional sidewall material increases the overall weight of the runflat tire. For example, a typical P275/40ZR17 low profile runflat tire weighs approximately 6.0 lbs. more than a corresponding non runflat tire. Employing this original prior art concept in a Goodyear P235/55R17 runflat tire of a higher aspect ratio meant that the total tire weight was about 6.8 pounds more than a corresponding non runflat tire.

Such prior art runflat design, regardless of aspect ratio, has several drawbacks. The two most important ones are heat build up in the inserts, due to flexure, and heavy weight.

RUNFLAT TIRE CONSTRUCTION

Figure 2:
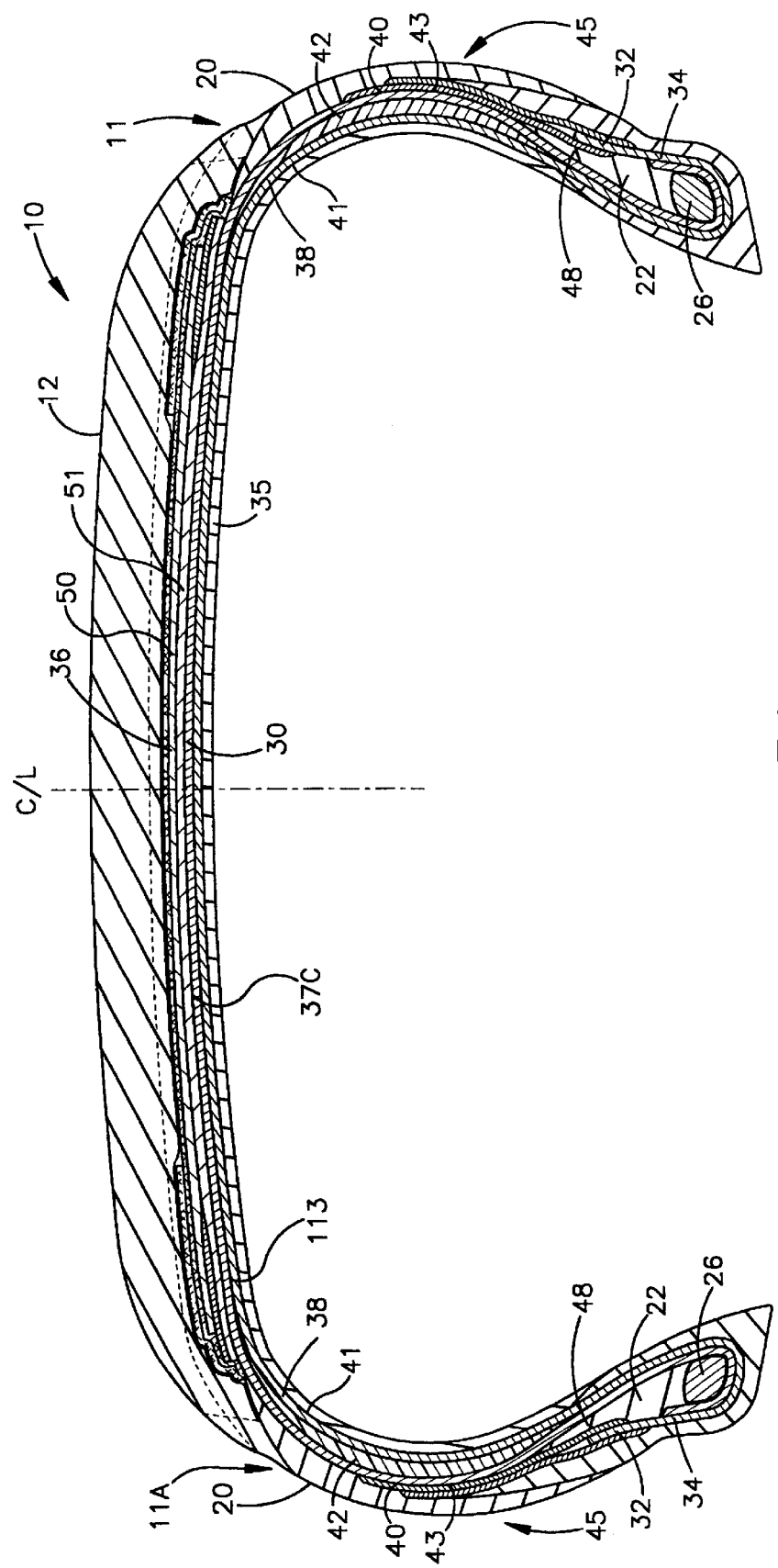
FIG. 2 is a cross-sectional view of a tread shoulder, a sidewall, and a bead region of the preferred embodiment tire of the invention.

FIG. 2 shows tire 10 according to the present invention, employing a unique internal construction within each sidewall 20. The improved runflat tire construction employs certain of the same components as that of the prior art tire described above, but with variations in location or quantity giving rise to alternative constructions in which the inventive concept can be practiced.

Tire 10, as illustrated in FIG. 2, is a runflat radial passenger or light truck tire. Tire 10 is provided with a ground-engaging tread portion 12 which terminates in the shoulder portions 11, 11A at the lateral edges of the tread portion. FIG. 2 shows sidewall portions 20 which extend from the lateral edges of the tread portion and terminate in the respective bead regions 22, each having an annular inextensible bead core 26. The tire 10 is further provided with a carcass reinforcing structure 30 which extends across the entire tire structure from bead region 22 through one sidewall portion 20, tread portion 12, opposite sidewall 20 portion 20 to bead region 22. The carcass reinforcing structure 30 includes the radial ply structure 37, comprising two plies 38 and 40, and an insert 42 located between and immediately adjacent to the two plies and in the flex area 45 of each sidewall. The turnup ends 32 or 34 of at least one ply 38 or 40 of radial ply structure 37 are wrapped about bead cores 26 on each side of the tire. Preferably, at least turnup ends 32 and most preferably turnup ends 32 and 34 are wrapped about the bead cores. The tire 10 may include a conventional innerliner 35 forming the inner peripheral surface of the tire 10 if the tire is to be of the tubeless type. Placed circumferentially about the radially outer surface of carcass reinforcing structure 30 and beneath tread portion 12 is a tread reinforcing belt structure 36. In the particular embodiment illustrated, belt structure 36 comprises two cut belt plies 50,51. The cords of belt plies 50,51 are oriented at an angle of about 15 degrees to about 35 degrees and preferably about 20 degrees to about 28 degrees with respect to the mid-circumferential centerline (C/L) of the tire. However, the belt structure 36 may comprise any number of belt plies of any desired configuration and of an orientation within a range of about 0 degrees to about 90 degrees. The belt structure 36 provides lateral stiffness across the belt width so as to minimize lifting of the tread from the road surface during operation of the tire in the uninflated condition. In the embodiments illustrated, the lateral stiffness is accomplished by making the cords of belt plies 50,51 of fiberglass, aramid and/or metal and preferably of steel and more preferably of a steel cable construction.

CARCASS REINFORCING PLY STRUCTURES

Figure 3:
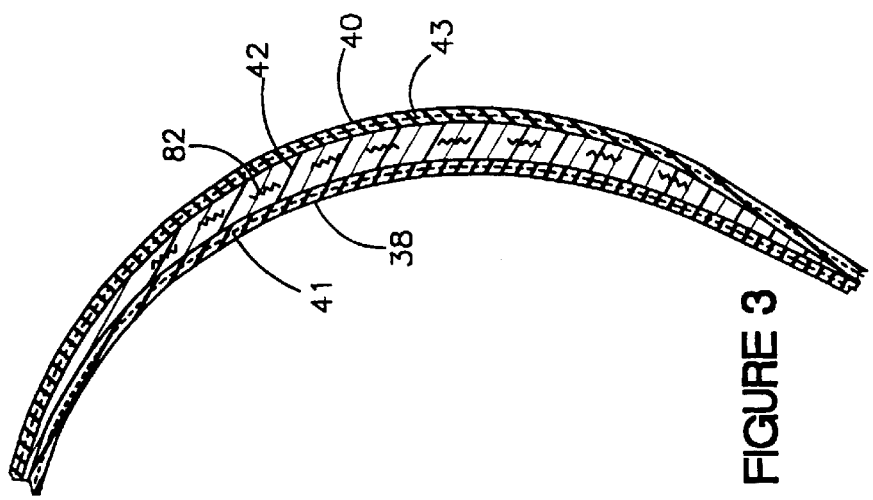
FIG. 3 shows an enlarged view of the radial plies and their respective reinforcing cords as well as fiber reinforcements within the insert.

The radial ply structure 37 of the preferred embodiment tire 10, as shown in FIG. 2, comprises two reinforcing ply structures 38,40. In the particular embodiment illustrated in FIG. 2, there is provided a radially inner first reinforcing ply structure 38 and a radially outer second reinforcing ply structure 40. Each ply structure 38,40 has preferably one layer of parallel cords 41, 43, respectively, as shown in FIG. 3. In the particular embodiment illustrated, the cords 41,43 are oriented at an angle of about 65 degrees to about 90 degrees and preferably at an angle of about 90 degrees with respect to the mid-circumferential equatorial plane. Preferably, both plies 38,40 are coated with an elastomeric material having high adhesion with rubber and high heat resistance.

OUTER PLY CORD STRUCTURE

In FIG. 3, cords 43 within outer ply 40 are made of such materials as are normally used for cord reinforcement of rubber articles, for example, and not by way of limitation to steel, aramid, rayon, nylon, polyester, fiberglass or other organic fiber cords with an elastic modulus in the range of about 2.5 GPa to about 124 GPa. Other suitable high elastic modulus fibers for cords include vinylon, polyethylene naphtalate, polyethylene terephtalate carbon fiber, glass fiber and polyamides.

In the embodiment illustrated in FIG. 2, the reinforcing cords 43 of ply 40 are made from rayon and function to support tensile stresses in the runflat condition, both the normal inflation and as discussed in more detail below.

INNER PLY CORD STRUCTURE

Referring again to FIG. 3, the metal cords 41 of inner ply 38 are of substantially inextensible metal, preferably steel having a high modulus of elasticity much greater than that of the organic fibers comprising the reinforcing cords 43 of ply 40. Ply 38 is disposed in contact with and bonded to the insert 42 to increase the compressive-load-bearing resistance to buckling of reinforcing cords 41 under runflat conditions. Each of the metallic cords 41 for use in ply 38 of carcass 30 may comprise from one wire or monofilament to multiple filaments which function to support compressive stresses, particularly under runflat conditions, as discussed in more detail below. The number of total wire filaments in the metallic cords 41 may range from 1 to 19. Preferably, the number of wire filaments per cord ranges from 6 to 9. The individual diameter of each filament generally ranges from about 0.10 to about 0.30 millimeters (mm) and preferably about 0.15 mm for each filament having at least a tensile strength of about 2000 MPa to about 5000 MPa, preferably at least about 3000 MPa. Preferably the metal cords are constructed of steel wire having a modulus greater than 150 Giga Pascals (Gpa) There are a number of specific metallic cord constructions 41 for use in the carcass ply 38. Representative examples of specific cord constructions include 1×, 2×, 3×, 4×, 5×, 6×, 7×, 8×, 11×, 12×, 1+2, 1+4, 1+5, 1+6, 1+7, 1+8, 2+1, 3+1, 5+1, 6+1, 11+1, 12+1, 2+7, 2+7+1, 3+8, 3+9, 1+5+1 and 1+6+1, 1+6+12 or 3+9+1, the outer wrap filament may have a tensile strength of 2500 MPa or greater based on a filament diameter of 0.15 mm. The most preferred cord constructions including filament diameters are 3×0.18, 1+5×0.18, 2+7×0.15, 2+7×0.15+1×0.15, 3+9×0.15+ 1×0.15, 3×0.20+9×0.18, and 3×0.20+9×0.18+1×0.15. The constructions resulting from the above cord designations are easily identified by those skilled in the art. For example, designation such as 2×, 3×, 4× and 5× mean a plurality of filaments; i.e., two filaments, three filaments, four filaments and the like. Designations such as 1+4 and 1+5 indicate, for example, a single filament wrapped by four or five filaments.

The carcass ply 38 has a layer of the above described metallic cords arranged so as to have from about 5 to about 100 ends per inch (approximately between 2 to 39 ends per cm) when measured at the equatorial plane of the tire. Preferably, the layer of cords are arranged so as to have about 7 to about 60 ends per inch (approximately between 2.7 to 24 ends per cm) at the equatorial plane. The above calculations for ends per inch are based upon the range of diameters for the cord, strength of the cord and the practical strength requirement for the carcass ply 38,40. For example, the high number of ends per inch would include the use of a lower diameter cord for a given strength versus a lower number of ends per inch for a higher diameter wire for the same strength. In the alternative, if one elects to use a cord of a given diameter, one may have to use more or less ends per inch depending on the strength of the cord. The metallic cords 41 of the carcass ply 38 are oriented such that the tire 10, according to the present invention, is what is commonly referred to as radial, meaning that the metallic cords 41 of the carcass ply 38 intersect the equatorial plane of the tire at an angle in the range of from about 75° to about 105°. Preferably, the metal cords intersect at an angle of from 82° to 98°. The most preferred range is from 88° to 92°.

The first and second reinforcing ply structures 38,40 each comprises a single ply layer. It is, however, within the terms of the present invention to include any number of additional reinforcing ply structures in such locations as to be axially outward of steel reinforced ply structure 38.

As further illustrated in FIG. 2, the innermost steel-reinforced ply structure 38 has a pair of turnup ends 32 which wrap about each bead core 26. The ends 34 of the second ply 40, which is reinforced by organic fiber cords, are in proximity to the bead cores 26 and terminate axially adjacent on either side of the bead cores 26, and/or above the bead cores 26, or can be wrapped around the bead cores 26 and terminate axially below the turnup ends 32 of the first ply 38 as shown. The turnup ends 32 of the first ply 38 wrap about the second ply ends 34 and the bead core 26.

SIDEWALL INSERT

As further illustrated in FIG. 2, sidewall portions 20 are each provided with a filler or sidewall insert 42. Each insert 42 extends from each bead region 22, which includes the beads 26 and the apex 48, radially to beneath the reinforcing belt structures 36 in each sidewall. The insert 42 is located between the innermost ply 38 and the organic-fiber-reinforced ply 40.

The single insert 42 in each sidewall 20 is preferably made of elastomeric material. The elastomeric material of insert 42 can be selected from a wide range of elastomers having shore A hardnesses from a relative soft shore A of about 50 to very hard 85. The insert shape, which is illustrated as having a crescent shaped cross-sectional profile, can be modified to insure good ride performance and an acceptable sidewall spring rate. The elastomeric compound has a tangent delta in the range of between about 0.02 to 0.06 and has a modulus G between about 2 MPa and about 8 Mpa (as measured at Metravib at 90° C., 0.2%).

An important aspect in selecting the elastomeric material for insert 42 is hysteresis. The hysteresis of the elastomeric material is a measure of its tendency to generate internal heat under flexing service conditions. Hysteresis is a term for heat energy expended in a material (e.g., cured rubber composition) by applied work, and low hysteresis of a rubber composition is indicated by a relatively high rebound, relatively low internal friction and relatively low loss modulus property values. Relatively speaking, a rubber or elastomeric material having a lower hysteresis generates less internal heat under service conditions than an otherwise comparable elastomeric or rubber with a substantially higher hysteresis. Thus, a relatively low hysteresis is desired for the rubber composition for the insert 42 and the plycoat(s) of plies 38 and 40.

In particular, for the purposes of this invention, the aforesaid sidewall insert 42 preferably has a high degree of stiffness yet also a relatively low hysteresis. This further reduces the heat-generating effects of flexure of insert 42, especially when the tire is operated under underinflated or runflat conditions. The tire's life, especially during runflat operation, is thereby improved over that of prior art runflat tires.

Generally, the stiffness of the rubber composition for insert 42 is desirable for strength and dimensional stability of the tire sidewall. Accordingly, it is important that the rubber or elastomeric compositions for inserts 42 and the plycoats of plies 38 and 40 have the properties of both relatively high stiffness and low hysteresis.

The important operating criteria for the insert 42 is that it can inhibit the collapse of the sidewall under runflat operating conditions while maintaining a low operating temperature. The insert 42, in combination with the compression-load-bearing metal-reinforced ply 38, prevents the tire's sidewall from collapsing when operating under runflat conditions of zero inflation pressure or under under-inflate pressure. Further, the use of a single insert in each sidewall of the present invention, in conjunction with a compression-load-bearing, steel-reinforced inner ply 38, reduces the gross tire weight compared to prior art runflat tire designs.

Figure 4B:
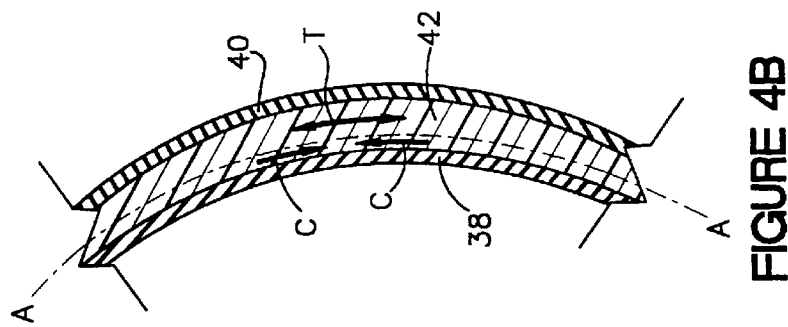
FIG. 4b is a cross-sectional schematic diagram showing a seegment of the insert and adjacent plies, the distribution of compressive and tensile stresses in the insert, and the approximate location the neutral bending axis within the insert.

To further enhance the compressive and/or tensile load bearing capacity of inserts 42, the elastomeric material can be filled with short reinforcing fibers 82, as shown in FIG. 3. The short fibers 82 are preferably oriented to enhance or increase the radial and lateral stiffness of the insert 42, and to increase the radial tensile bearing strength of the outer liner. That is, the fibers 82 are radially oriented to enhance or increase the tensile strength properties of the portions of insert 42 that are farthest removed from ply 38 when operated under runflat conditions involving bending stresses in which the neutral bending axis A—A, as shown in FIG. 4b, lies between ply 38 and ply 40.

Preferably the reinforcing fibers 82 are made of material selected from the group of materials comprising of rayon, polyester, nylon, aramid, and other organic fibers such as those used for cords 43, described before. These short fibers 82 can be radially directed or positioned at bias angles preferably of at least 45° but should not be circumferentially oriented.

For ease of manufacturing and in order to protect the steel ply from liner Penetration, it may be of interest to add an elastomeric insert in the sidewall areas between inner liner 35 and the ply 38.

Dynamic Operation of Preferred Embodiment

The idea of the invention is to use the compression-bearing capacity of metal-cord reinforced inner ply 38 to reduce the amount of necessary material for insert 42 by shifting a large portion of the compressive load otherwise on insert 42, especially during runflat operation onto ply 38. The sidewall insert 42 can thus be lighter in weight than corresponding inserts in prior art runflat tire designs, and since a large portion of the compressive load on the tire sidewalls 20 is borne by the metal reinforcing cords 41 of ply 38, the insert undergoes less cyclical flexure during runflat operation and thus generates less heat. The metal cords 41 of ply 38 have the added benefit of relatively high thermal conductivity compared to the rubber and other elastomeric materials of the tire 10 and insert 42. Thus the metal cords 41 of ply 38, by virtue of their thermal conductivity, convey heat away from insert 42 during runflat operation, thereby contributing to longer runflat service life of the insert during runflat operation.

Figure 4A:
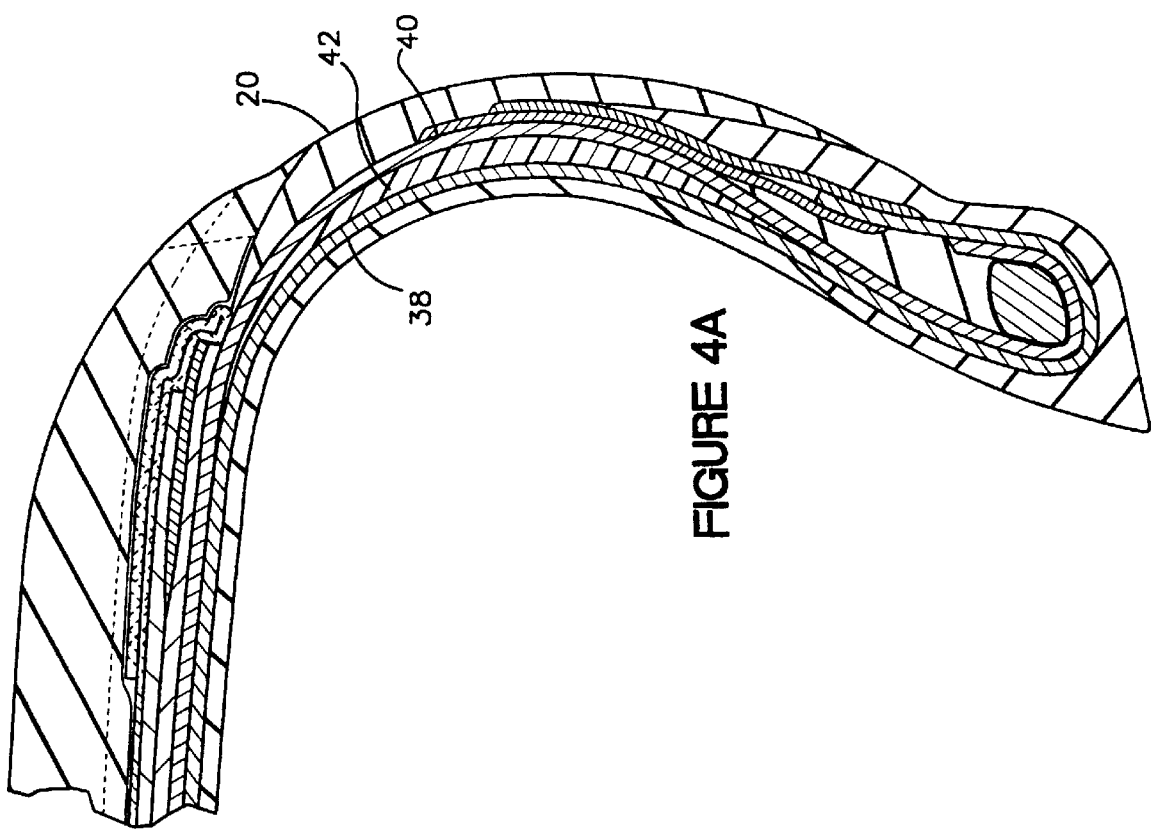
FIG. 4a is a fragmentary cross-sectional view showing one sidewall and the insert and plies.

FIG. 4a shows the sidewall 20 of a normally inflated runflat tire in fragmental cross-sectional view, according to this invention. The cire 10 includes an insert 42 between adjacent plies 38 and 40. FIG. 4b demonstrates the stress distribution in a segment of the insert 42 and the adjacent plies 38 and 40, when the tire 10 is uninflated and sidewall 20, as shown in FIG. 4a, is deflected axially outward. In FIG. 4b, the axially outward bending of the sidewall is shown inducing tensile stresses (T) on one side of the neutral bending axis (A—A) while compressive stresses (C) exist on the other side of the neutral bending axis.

In FIG. 4b, the neutral axis (A—A) is shown further from the outer fabric ply 42 since steel ply 38 can carry a significant portion of the tire's compressive load in the runflat mode. The bending stiffness of the tire sidewall is thus greatly increased and the tire deflection consequently reduced.

The insert 42 in each sidewall 20 acts as a spacer between the adjacent plies 38,40. The cords 43 of the organic-fiber reinforced ply 40 are placed in tension when the tire is operated in an underinflated or uninflated condition. The insert, when reinforced with fibers 82 (FIG. 3) in each sidewall, contributes tensile -stress-bearing strength of the insert in the sidewall supporting structure—specially in combination with the compression-load-bearing properties of the metal-reinforced ply 38.

The runflat tire 10 as described above enables the tire designer to "tune" a particular tire design according to specific user needs, for example, by increasing the compressive load varying strength of the steel reinforced ply 38 and/or by increasing or reducing the amount of fiber reinforcement 83 in insert 42. The combination of unique features means that the designer can choose among improved runflat performance, service life and tire weight reduction. The tire's design can be "tuned" by the designer, for a comfortable ride and nandling when normally assisting the insert 42 in carrying a large portion of the tire's load when running uninflated or underinflated.

One obvious advantage of the metal cords 41 is that when the tire 10 runs uninflated, not only is the operation of ply 38 with the metal cords 41 not comprised by the heat buildup, but the metal cords act to uniformly distribute the heat across the carcass structure 30 (FIG. 2), as discussed in detail hereinafter. This means that improved runflat tire performance can be achieved in a light-weight runflat tire design.

The inventors believe that the use of the metal cords 41 in innermost ply 38 is more beneficial than the case where the metal cord is in the outer ply 40, as demonstrated in U.S. patent application Ser. No. 08/865,489, because compression-stress-bearing metal reinforcing cords 41 in ply 38 work like a compression-load carrying member stiffening the sidewall 20 when the tire 10 is operated in the uninflated or underinflated runflat condition. The metal cords 41, being surrounded by rubber, are capable of substantial sidewall compressive-load carrying support.

When the runflat tire is operated in the uninflated state, the compression-load-bearing capacity of the high-modulus ply 38 is sufficient to prevent the tire from buckling or collapsing onto itself.

The inventors also believe that the high thermal conductivity of the metal reinforcing cords 41 of inner ply 38 will offer the added advantage of distributing heat away from the insert 42 in each sidewall. Heat is generated in insert 42 under normal operating conditions, due to flexure of the insert, but heat is especially produced under runflat conditions when the bending load on and flexure of insert 42 becomes greater than during normal fully inflated operation.

The tire 10 of the present invention can use a wide range of materials of differing physical properties such that the insert 42 and the plycoats for the plies 38,40 may each be distinctively different and selected for the desired ride, handling and runflat performance needed. In other words, the designer can selectively tune the materials individually to achieve to desired tire performance properties.

In summary, this invention consists of a runflat tire 10 having two carcass plies 38 and 40 having metal-cord-reinforcing 41 and fabric-reinforcing cords 43, separated by an insert 42 in the sidewall flex area. In runflat operation, organic-fiber-reinforced ply 40 supports tensile stresses while part of insert 42 and especially the metal-cord-reinforced ply 38 supports compression stresses. The wire-reinforced ply 38 will also redistribute the heat generated by the insert 42 throughout the carcass 30. Furthermore, the heat buildup in insert 42 is lessened by the combined effects of a reduced total mass and thickness, and by the thermal conductivity of metal cords 41, which act to distribute the heat away from the insert and sidewall flex area 45. The result is a light-weight runflat tire having good performance capabilities under conditions of both normal inflated pressure operation and runflat operation.

EMBODIMENT ONE

Referring to FIG. 2, there is illustrated a first embodiment of the invention incorporating a runflat tire 10 having a low-aspect-ratio design in the range of about 30 to about 55. This embodiment would be useful for light-weight runflat capability in high-performance sports type vehicles or light trucks. The low-aspect-ratio runflat radial ply pneumatic tire 10 contains two radial plies 38,40. The innermost ply 38 is reinforced with high-modulus, essentially inextensible metal cords 41 designed to withstand compressive stresses during runflat operation and both compressive and tensile stresses during normal inflated operation. The outermost ply 40 is reinforced with organic fiber cords 43 oriented to withstand tensile stresses during runflat operation as well as during normal inflated operation. A pair of sidewalls 20 is each reinforced with a single sidewall insert 42. During runflat operation, the metal-cord reinforced inner ply carries a large portion of the sidewall's compressive load deriving from both the vehicle weight and the sidewall flexure due to the vehicle weight. Insert 42 is stiffened to carry compressive loads on its side adjacent to ply 38, and tension on its side adjacent to ply 40. The combination of compression-bearing cords 41, in conjunction with a single insert 42 having low hysteresis and high rigidity, results in a light-weight tire type having runflat capability.

EMBODIMENT TWO

A second embodiment of this invention (not shown) is envisioned in which a high-aspect-ratio design in the range of about 60 to about 80, similar to the low-aspect-ratio design shown in FIG. 2, provides a high-profile tire. An example of a high-profile embodiment would be in luxury-type vehicles, high-standing sport-utility vehicles and some light trucks. As with EMBODIMENT ONE, during runflat operation, the metal-cord reinforced inner ply 38, carries a large portion of the sidewall's compressive load deriving from both the vehicle weight and the sidewall flexure due to the vehicle weight. The high-profile embodiment of this invention would incorporate such adjustments to the fiber content or other compositional of the compound of insert 42 as needed to accommodate the change in tire geometry associated with high-profile tires incorporating this invention. Accordingly, the essentially inextensible cords 41 of ply 38 can be adjusted, in cross-section or number of wires, by the tire designers to accommodate the greater bending and compressive stresses associated with high-profile runflat tire use on heavy luxury vehicles under conditions of normal inflated operation, to provide the user's anticipated comfortable ride.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A pneumatic radial ply runflat passenger tire having a tread, a casing with two sidewalls, two annular beads, a radial ply structure extending between the two annular beads and a belt structure located between the tread and the radial ply structure, the radial ply structure characterized by:

an innermost radial ply having metal reinforcement cords capable of supporting compressive loads under runflat operating conditions;

an outer radial ply having non-metallic reinforcement cords capable of supporting tensile loads under runflat operating conditions; and a single insert in each sidewall, the single insert having a neutral bending axis therethrough, the single insert being circumferentially disposed between the innermost and outer radial plies and in a flex area of each sidewall, such that under runflat operating conditions a neutral bending axis is located within the insert but further from the outer ply, for reducing the flexure of the sidewall.

2. The pneumatic runflat radial ply tire of claim 1 further characterized by the insert disposed to separate the innermost and outer radial plies.

3. The pneumatic runflat radial ply tire of claim 2 further characterized by the insert being constructed of an elastomeric compound having a tangent delta in the range of between about 0.02 to 0.06 and a modulus G between 2 and 8 MPa (Metravib, 90° C., 0.2%).

4. The pneumatic runflat radial ply tire of claim 3 further characterized by the insert being filled with short reinforcing fibers being aligned primarily in the radial direction to increase the tensile-stress-bearing capacity of the insert.

5. The pneumatic runflat radial ply tire of claim 4 further characterized by the reinforcing fibers being selected from the group of materials including nylon, aramid, polyester, rayon and glass.

6. The pneumatic runflat radial ply tire of claim 3 further characterized by the insert having a Shore A hardness of about 50 to about 85.

7. The pneumatic runflat radial ply tire of claim 1 further characterized by the insert being circumferentially disposed immediately adjacent to the innermost and outer radial plies.

8. The pneumatic runflat radial ply tire of claim 1 further characterized by the innermost radial ply having metallic cords at an angle of from about 75 degrees to about 105 degrees with respect to the equatorial plane of the tire.

9. The pneumatic runflat radial tire of claim 1 further characterized by:

the innermost radial ply having relatively high-modulus metallic cords constructed from the group of materials including steel wire having a tensile strength of about 2000 MPa to about 5000 MPa and a modulus greater than about 150 GPa; and the outer radial ply having relatively low-modulus non-metallic cords having an elastic modulus in the range of about 2.5 GPa to about 124 GPa.

10. The pneumatic runflat radial ply tire of claim 1 further characterized by the innermost radial ply being disposed in contact with, and being bonded to, the insert to provide compressive-load-bearing resistance to buckling under runflat conditions.

11. The pneumatic runflat radial ply tire of claim 1 further characterized by the outer radial ply being reinforced by cords constructed of materials from the group including nylon, rayon, aramid, polyester and fiberglass.

12. The pneumatic runflat radial ply tire of claim 1 further characterized by:

the innermost radial ply extending continuously between the two annular beads and having turnup ends that are wrapped about the two annular beads; and the outer radial ply extending continuously between the two annular beads and preferably having turnup ends that are wrapped about the two annular beads.

* * * * *